United States Patent
Gumeci et al.

(10) Patent No.: US 10,411,267 B2
(45) Date of Patent: Sep. 10, 2019

(54) HIGHLY POROUS CATHODE CATALYST LAYER STRUCTURES FOR FLEXIBLE SOLID OXIDE FUEL CELL APPLICATIONS IN VEHICLES

(71) Applicant: Nissan North America, Inc., Franklin, TN (US)

(72) Inventors: Cenk Gumeci, Walled Lake, MI (US); David Thompson, Grand Blanc, MI (US)

(73) Assignee: Nissan North America, Inc., Franklin, TN (US)

( * ) Notice: Subject to any disclaimer, the term of this patent is extended or adjusted under 35 U.S.C. 154(b) by 130 days.

(21) Appl. No.: 15/823,434

(22) Filed: Nov. 27, 2017

(65) Prior Publication Data
US 2019/0165380 A1    May 30, 2019

(51) Int. Cl.
| | |
|---|---|
| *H01M 8/10* | (2016.01) |
| *H01M 4/90* | (2006.01) |
| *H01M 8/00* | (2016.01) |
| *H01M 4/88* | (2006.01) |
| *C01G 55/00* | (2006.01) |
| *C01F 17/00* | (2006.01) |
| *C01G 25/02* | (2006.01) |

(52) U.S. Cl.
CPC ....... *H01M 4/9033* (2013.01); *H01M 4/8803* (2013.01); *H01M 8/006* (2013.01); *C01F 17/0043* (2013.01); *C01G 25/02* (2013.01); *C01G 55/00* (2013.01)

(58) Field of Classification Search
CPC .. H01M 4/9033; H01M 4/8803; H01M 8/006; C01G 25/02; C01G 55/00; C01F 17/0043
See application file for complete search history.

(56) References Cited

U.S. PATENT DOCUMENTS

| | | | |
|---|---|---|---|
| 5,942,349 A | 8/1999 | Badwal et al. | |
| 2002/0048700 A1* | 4/2002 | Virkar | H01M 8/0206 429/454 |
| 2014/0272622 A1 | 9/2014 | Xing et al. | |

* cited by examiner

*Primary Examiner* — Cynthia K Walls
(74) *Attorney, Agent, or Firm* — Young Basile Hanlon & MacFarlane, P.C.

(57) ABSTRACT

A solid oxide fuel cell (SOFC) includes a cathode having a yttria stabilized zirconia (YSZ) structure. The YSZ structure is in contact with a solid electrolyte layer. A lanthanum strontium manganite (LSM) structure is deposited on the YSZ structure to form a composite cathode. The cathode includes a catalyst layer. The catalyst layer is a mesoporous nanoionic catalyst material integrated with the YSZ and LSM structures. Alternatively, or in addition to, the mesoporous nanoionic catalyst material may be coated onto the YSZ and LSM structures or embedded into the YSZ and LSM structures. The mesoporous nanoionic catalyst material may form an interconnected fibrous network.

20 Claims, 8 Drawing Sheets

HIGHLY POROUS CATHODE CATALYST LAYER STRUCTURES FOR FLEXIBLE SOLID OXIDE FUEL CELL APPLICATIONS IN VEHICLES

TECHNICAL FIELD

This disclosure relates to a structured anode for a solid oxide fuel cell.

BACKGROUND

Solid oxide fuel cells (SOFCs) allow for conversion of electrochemical fuel to electricity with negligible pollution. Among fuel cells under development, the SOFCs operate at temperatures ranging from 600° C. to 1000° C. Because the SOFCs operate at such high temperature, the materials used as components are thermally challenged.

SUMMARY

Disclosed herein are implementations of a solid oxide fuel cell (SOFC). A SOFC may include a current collector, a solid electrolyte layer, and a cathode. The cathode may include a yttria stabilized zirconia (YSZ) structure. The YSZ structure may extend between the current collector and the solid electrolyte layer. The YSZ structure may be in contact with the solid electrolyte layer. The cathode may be a composite cathode. For example, a lanthanum strontium manganite (LSM) structure may be deposited on the YSZ structure. The cathode may be a mixed ionic electronic conductor (MIEC). For example, the cathode may include Sr-doped lanthanum ferrite (LSF) materials, Sr-doped lanthanum ferro-cobaltite (LSCF) structures or lanthanum nickelate (LNO) structures.

The cathode may include a catalyst layer. The catalyst layer may be a mesoporous nanoionic catalyst material coated onto the YSZ and LSM structures. Alternatively, or in addition to, the mesoporous nanoionic catalyst material may be embedded into the YSZ and LSM structures. The mesoporous nanoionic catalyst material may form an interconnected fibrous network.

Implementations may include one or more of the following features. The mesoporous nanoionic catalyst material of the SOFC may include $ZrO_2$ and a base metal. The base metal of the SOFC may include Pt, PtPd, PtNi, PtCu, PtFe, PtPdNi, PtPdCu, PdCu, PdNi, or PdFe. The mesoporous nanoionic catalyst material may be a base metal and a mixed oxide of $ZrO_2$—$CeO_2$. The mesoporous nanoionic catalyst material may have a thickness of approximately 0.25 nm to 200 nm. The the mesoporous nanoionic catalyst material may have a pore diameter of approximately 2 nm to 50 nm.

In some embodiments, the SOFC may include one or more mesoporous getter layers deposited on the LSM structure and/or the YSZ structure to collect chromium (Cr) vapor and mitigate the effects of Cr-poisoning. The SOFC may also include one or more mesoporous getter layers deposited on the mesoporous nanoionic catalyst material to collect Cr vapor.

In some embodiments, the SOFC may include a mixture of one or more mesoporous getter layers and one or more mesoporous nanoionic catalyst materials to form a single mixed mesoporous gather layer. The one or more mesoporous getter layers may include $SrO_2$, $SrNiO_3$, MnO, or $Mn_2O_3$. The one or more mesoporous getter layers may have a thickness of 1 nm to 1 micron. The thickness of the one or more mesoporous getter layers may be dependent on the location of the one or more mesoporous getter layers. For example, the thickness of the getter layer may be reduced when the mesoporous getter layer and the mesoporous nanoionic catalyst materials are combined to form a single mixed mesoporous gather layer. The one or more mesoporous getter layers may each have a pore diameter of approximately 2 nm to 50 nm.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

SOFCs operate at high temperatures, typically between 500 □ and 1000 □. LSM cathodes are commercially preferred because of their compatibility with doped zirconia electrolytes. Mechanically, LSM has a similar coefficient of thermal expansion (CTE) to YSZ, and therefore limits stress buildup due to CTE mismatch. In addition, LSM exhibits low levels of chemical reactivity with YSZ which extends the lifetime of the materials. LSM, however, is a poor ionic conductor, and therefore the electrochemically active reaction is limited to the triple phase boundary (TPB) where an electrolyte, air and electrode meet.

LSM is an effective material for a cathode at high temperatures, however its performance deteriorates rapidly as the operating temperature is decreased below 800 □. In order to increase the reaction zone beyond the TPB, a potential cathode material must be able to conduct both electrons and oxygen ions. Composite cathodes that include LSM and YSZ may be used to increase the TPB length. MIECs such as LSCF and LNO may be candidate cathode materials used to reduce working temperatures (600-800 □) due to their increased oxygen transport properties when compared to LSM.

Typical SOFCs are prone to inefficiency due to impurity formation and reduced electronic and ionic transport. Poisoning due to contaminates such as sulfur in the fuel gas can occur. In addition, the cathode layer of typical SOFCs are known to react with the current collector causing resistance and instability. For example, chromium (Cr) poisoning of cathodes from chromia-forming alloy interconnectors is one of the major challenges in long-term operation of SOFCs. Typical cathode materials suffer from increased Cr-poisoning arising from a Cr-rich metallic current collector resulting in a drastic drop in cell voltage. It would therefore be desirable to have cathode structures that enhance ionic and electronic conduction, improve poisoning tolerance and increase gas transport surface area, improving the overall power density of the SOFCs.

Figure 1:
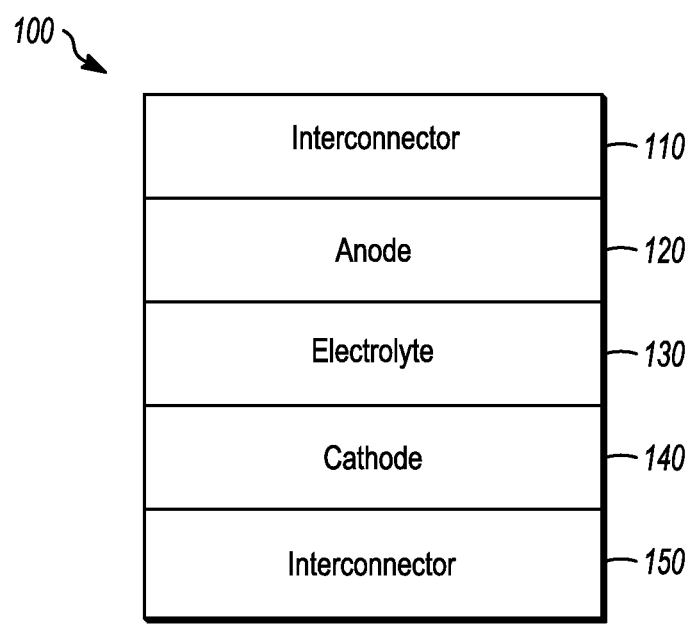
FIG. 1 is a diagram of an example SOFC.

FIG. 1 is a diagram of an example SOFC stack 100. The SOFC stack 100 includes an interconnector 110, an anode 120, an electrolyte 130, a cathode 140, and an interconnector 150.

Interconnector 110 may be a bipolar plate. Interconnector 110 may also be referred to as a current collector and may be a metallic or a ceramic layer that is disposed on the anode 120. Some examples of a ceramic interconnector composition may include lanthanum chromite and/or yttrium chromite. Suitable dopants for the ceramic interconnector composition may include nickel, cobalt, vanadium, calcium, strontium, magnesium, copper, manganese, and titanium. Some examples of a metallic interconnector composition may include chromia-based alloys, ferritic stainless steel, stainless steel, and iron/nickel-based super alloys.

The interconnector 110 is used to connect two or more SOFCs in series to combine the electricity that each SOFC generates. Because the interconnector 110 is exposed to both the oxidizing and reducing side of the SOFC at high temperatures, it must be constructed from an extremely stable material.

The anode 120 should exhibit catalytic properties and possess high porosity for the mass transport of reactant and product gases. The anodes may be formed of a nickel-based cermet, although a ceria-based anode or a titanium-based anode are also contemplated. One example of a nickel-based cermet includes YSZ and is referred to as Ni/YSZ. Alternative anode cermet compositions may include a samaria-doped ceria (SDC), for example Ni/SDC or may include a gadolinium-doped ceria (GDC), for example Ni/GDC. Additional anode compositions may include a nickel-based catalyst containing mixtures of cobalt and/or dopants of precious metals such as palladium, rhodium, and/or platinum.

Electrolyte 130 is a dense electrolyte that is sandwiched between the anode 120 and the cathode 140. The electrolyte 130 is an oxide conducting electrolyte that possesses a fluorite structure or perovskite structure.

Cathode 140 is an air electrode that has a porous structure that allows diffusion of gaseous oxygen towards the cathode/electrolyte interface. The cathode 140 may be formed of YSZ. Cathode 140 compositions may include perovskite materials, for example, LSM-based perovskites. Other example cathode 140 compositions may include Sr-doped LSF materials and Sr-doped LSCF materials. In the examples disclosed herein, cathode 140 is described as a composite cathode that includes LSM and YSZ, however it is understood that the cathode 140 may be a Sr-doped LSF cathode, an LSCF cathode, or any other suitable cathode. The porous structure of cathode 140 provides pathways of YSZ from the current collector 150 to the electrolyte 130, improving ionic transport through the cell.

Interconnector 150 may be a bipolar plate. Interconnector 150 may also be referred to as a current collector and may be a metallic or a ceramic layer that is disposed on the cathode 140. Some examples of a ceramic interconnector composition may include lanthanum chromite and/or yttrium chromite. Suitable dopants for the ceramic interconnector composition may include nickel, cobalt, vanadium, calcium, strontium, magnesium, copper, manganese, and titanium. Some examples of a metallic interconnector composition may include chromia-based alloys, ferritic stainless steel, stainless steel, and iron/nickel-based super alloys.

The interconnector 150 is used to connect two or more SOFCs in series to combine the electricity that each SOFC generates. Because the interconnector 150 is exposed to both the oxidizing and reducing side of the SOFC at high temperatures, it must be constructed from an extremely stable material.

Figure 2:
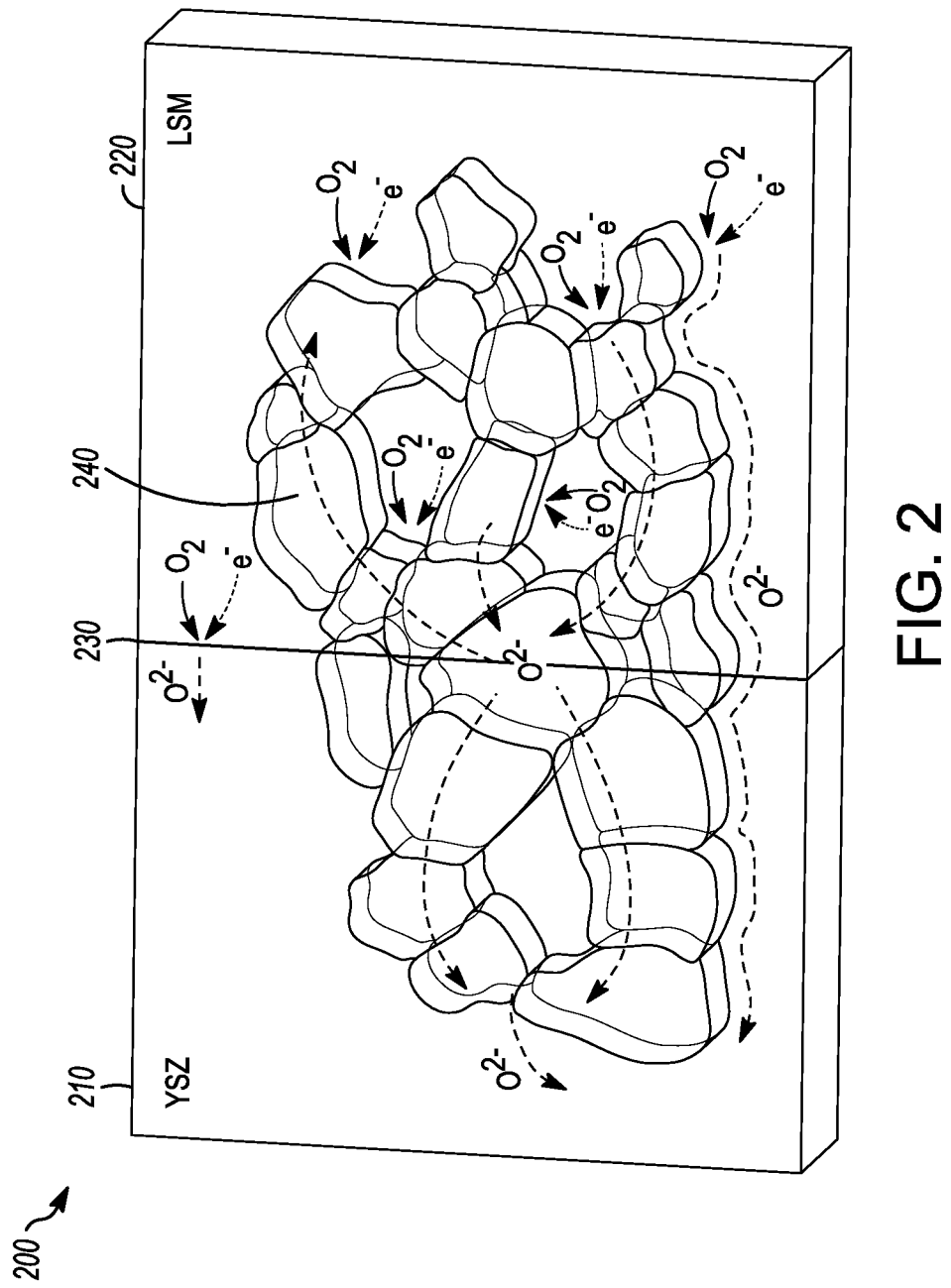
FIG. 2 is a diagram of an example mesoporous network integrated with the YSZ and LSM structures of a composite cathode.

FIG. 2 is a diagram of an example catalyst layer structure 200 of a cathode. The catalyst layer structure 200 includes a YSZ structure 210 and an LSM structure 220. A TPB 230 is formed where the YSZ structure 210 and the LSM structure 220 are in contact with each other. The TPB 230 is the active site where the oxygen reduction reactions occur. The catalyst layer structure 200 includes a mesoporous network 240 that is integrated with the YSZ structure 210 and the LSM structure 220. In this example, cathode 140 is a composite cathode that includes a YSZ structure 210 and an LSM structure 220. Although cathode 140 is shown with one YSZ structure and one LSM structure, it is understood that cathode 140 may include several YSZ structures and LSM structures.

Referring to FIG. 2, the mesoporous network 240 is integrated with the YSZ structure 210 and the LSM structure 220. The mesoporous network 240 may be embedded in the YSZ structure 210 and the LSM structure 220 such that it forms a continuous fibrous network through the YSZ structure 210 and the LSM structure 220. Alternatively, or in addition to, the mesoporous network 240 may be coated onto the YSZ structure 210 and the LSM structure 220 such that it forms a continuous fibrous network coating on the YSZ structure 210 and the LSM structure 220.

The mesoporous network 240 may be a mesoporous material that provides electron transport as shown in FIG. 2. The mesoporous material may include a nanoionic catalyst material, such as $ZrO_2$, and a base metal, such as Pt, and may form a fibrous network having a pore diameter from 2 nm to 50 nm. Alternatively, the nanoionic catalyst material may be a mixed oxide of $CeO_2$—$ZrO_2$. Alternative examples of the base metal may include Pd, Ag, Au (or their alloy combination), as well as PtCo, PtCoCu, PtPd, PtNi, PtCu, PtFe, PtPdNi, PtPdCu, PdCu, PdNi, or PdFe. The base metal may be porous or solid. The mesoporous material is described herein as a Pt—$ZrO_2$ for exemplary purposes only, and it is understood that the mesoporous material may include any combination of the nanoionic catalyst materials and base metals as described above. The mesoporous network 240 may be implemented in any of the embodiments disclosed herein.

The mesoporous material increases the surface areas for gas transport and the improved ionic and electronic conduction in the cathode, decreasing the overpotentials associated with the adsorption/diffusion charge transfer step in the oxidation reaction. Improving the ionic and electronic conduction in the cathode will also result in a reduction in cell operating temperature. Reducing the operating temperature will increase the redox and thermal stability and reliability of the cathode.

Figure 3A:
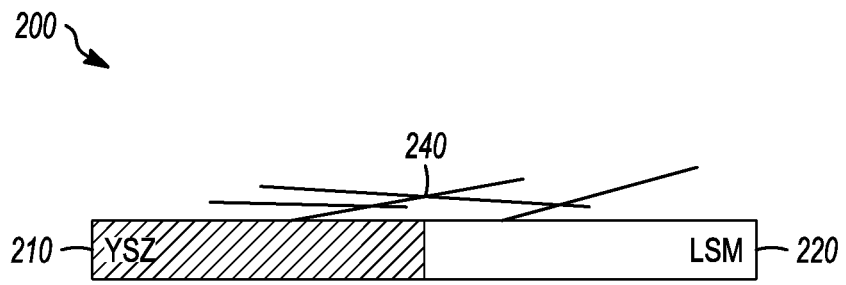
FIG. 3A is a diagram of an example embodiment showing a side view of the mesoporous network deposited on the YSZ/LSM.

FIG. 3A is a diagram of an example embodiment showing a side view of the catalyst layer structure 200 of FIG. 2. Referring to FIG. 3A, the catalyst layer structure 200 includes a YSZ structure 210, an LSM structure 220, and a mesoporous network 240. In this example, the mesoporous network 240 is deposited on the surfaces of the YSZ structure 210 and the LSM structure 220 such that it forms a porous coating. The mesoporous network 240 may have a thickness of one (1) atomic monolayer which is equivalent to approximately 550 ng Pt/cm$^2$ and corresponding to approximately 0.25 nm to 200 nm. The mesoporous network 240 may have a pore diameter from 2 nm to 50 nm.

Figure 3B:
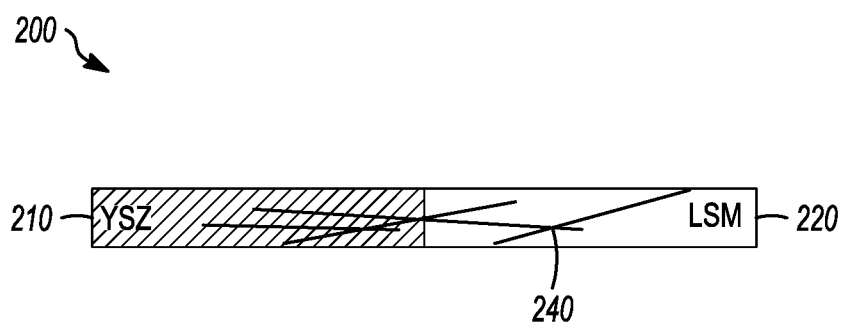
FIG. 3B is a diagram of an example embodiment showing a side view of the mesoporous network embedded in the YSZ/LSM.

FIG. 3B is a diagram of another example embodiment showing a side view of the catalyst layer structure 200 of FIG. 2. Referring to FIG. 3B, the catalyst layer structure 200 includes a YSZ structure 210, an LSM structure 220, and a mesoporous network 240. In this example, the mesoporous network 240 is embedded in the YSZ structure 210 and the LSM structure 220 such that it forms a continuous fibrous network through the YSZ structure 210 and the LSM structure 220. The mesoporous network 240 may have a thickness of one (1) atomic monolayer which is equivalent to approximately 550 ng Pt/cm$^2$ and corresponding to approximately 0.25 nm to 200 nm. The mesoporous network 240 may have a pore diameter from 2 nm to 50 nm.

Figure 4:
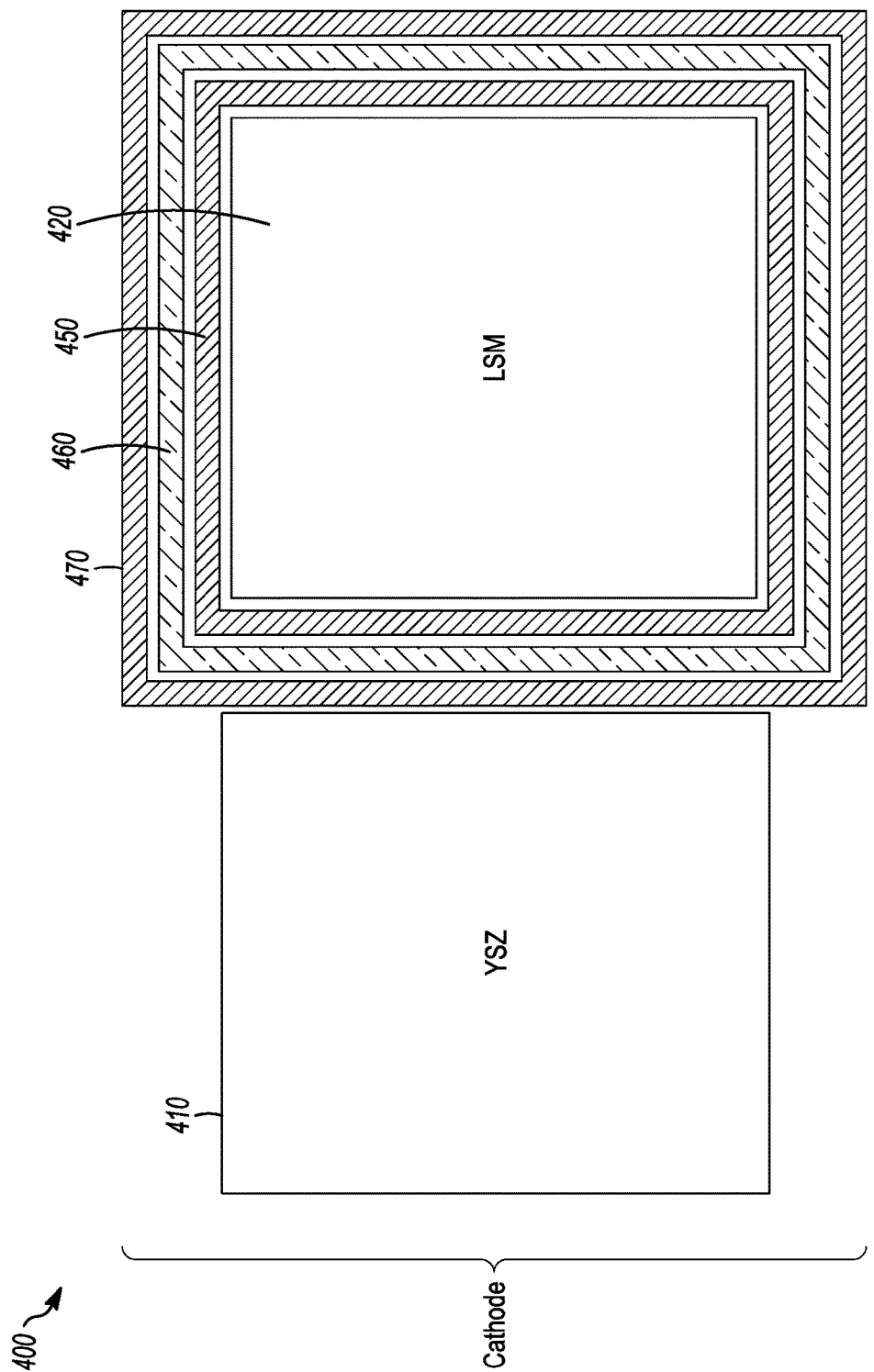
FIG. 4 is a diagram of an example embodiment showing a top view of a cathode with the LSM wrapped in a first getter layer, a catalyst layer, and a second getter layer.

FIG. 4 is a diagram of an example embodiment showing a top view of a cathode 400. As shown in FIG. 4, cathode 400 includes a YSZ structure 410 and an LSM structure 420. Although not shown in FIG. 4, the YSZ structure 410 and the LSM structure 420 may be in contact with each other. In order to mitigate the effects of Cr-poisoning at the TPB, one or more getter layers may be added to the cathode 400. In this example, the LSM structure 420 is coated in a first getter layer 450. The first getter layer 450 is porous and is coated in a catalyst layer structure 460. The catalyst layer structure 460 is porous and is coated in a second getter layer 470, which is also porous. The catalyst layer structure 460 may have a thickness of approximately 0.25 nm to 200 nm and a pore diameter from 2 nm to 50 nm. The catalyst layer structure 460 may be a mesoporous network that forms a continuous fibrous network coating between the first getter layer 450 and the second getter layer 470.

The first getter layer 450 and the second getter layer 470 may each be mesoporous structures of $SrO_2$, $SrNiO_3$, MnO, or $Mn_2O_3$ having a thickness from 1 nm to 1 micron and a pore diameter from 2 nm to 50 nm. In some embodiments, the first getter layer 450 and the second getter layer 470 may be mixed with the catalyst layer structure 460 to form a single mixed catalyst-getter layer. The thickness of the single mixed catalyst-getter layer may be less than thickness of the getter layer-catalyst layer-getter layer structure shown in FIG. 4. The first getter layer 450, the catalyst layer structure 460, and/or the second getter layer 470 may be implemented in any of the embodiments disclosed herein.

Figure 5:
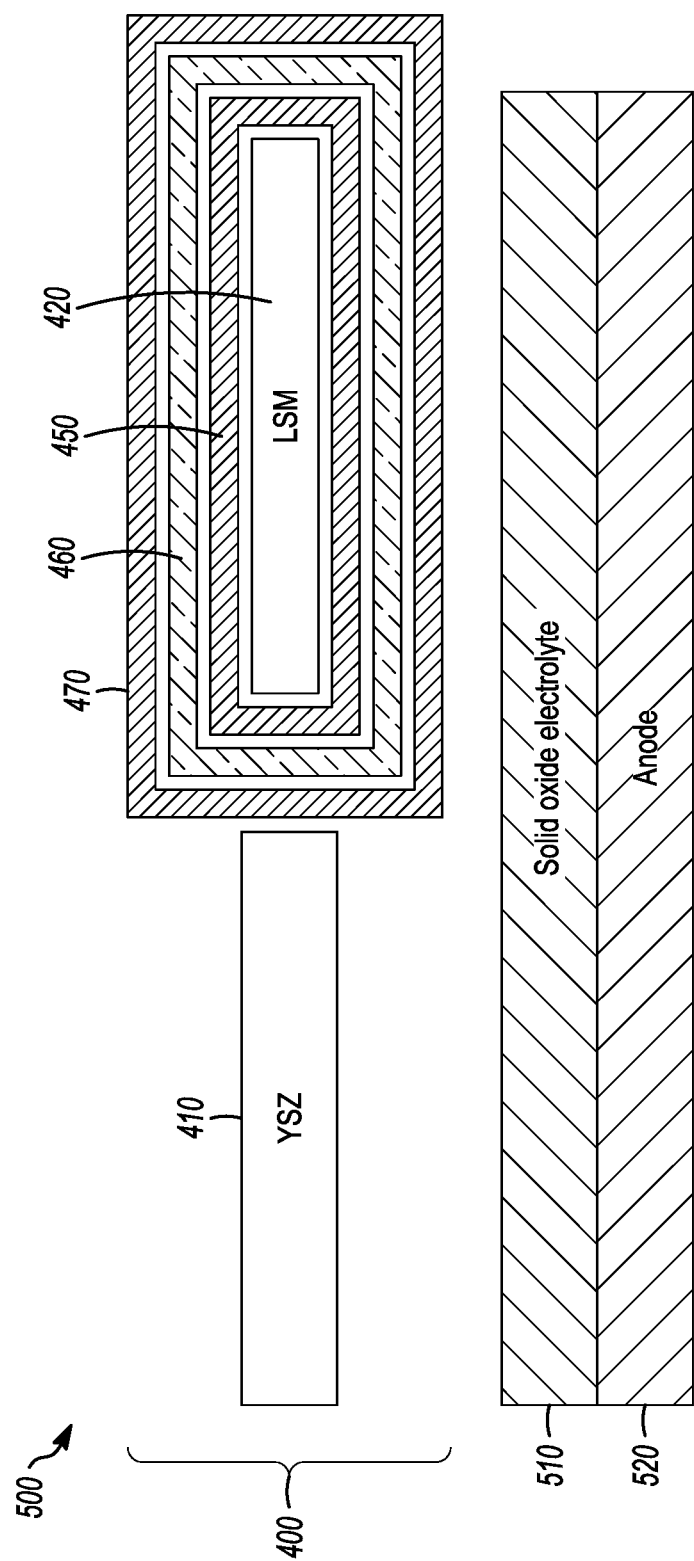
FIG. 5 is a diagram of a side view of the example embodiment shown in FIG. 4.

FIG. 5 is a diagram of a side view of the example embodiment shown in FIG. 4. As shown in FIG. 5, a side view of a partial SOFC stack 500 includes a cathode 400, a solid oxide electrolyte 510, and an anode 520. As shown in FIG. 5, the cathode 400 includes a YSZ structure 410 and an LSM structure 420. Although not shown in FIG. 5, the YSZ structure 410 and the LSM structure 420 may be in contact with each other. The LSM structure 420 is coated in a first getter layer 450. The first getter layer 450 is porous and is coated in a catalyst layer structure 460. The catalyst layer structure 460 is porous and is coated in a second getter layer 470, which is also porous. The catalyst layer structure 460 may have a thickness of approximately 0.25 nm to 200 nm and a pore diameter from 2 nm to 50 nm. The catalyst layer structure 460 may be a mesoporous network that forms a continuous fibrous network coating between the first getter layer 450 and the second getter layer 470.

The first getter layer 450 and the second getter layer 470 may each be mesoporous structures of $SrO_2$, $SrNiO_3$, MnO, or $Mn_2O_3$ having a thickness from 1 nm to 1 micron and a pore diameter from 2 nm to 50 nm. In some embodiments, the first getter layer 450 and the second getter layer 470 may be mixed with the catalyst layer structure 460 to form a single mixed catalyst-getter layer. The thickness of the single mixed catalyst-getter layer may be less than thickness of the getter layer-catalyst layer-getter layer structure shown in FIG. 5.

Figure 6:
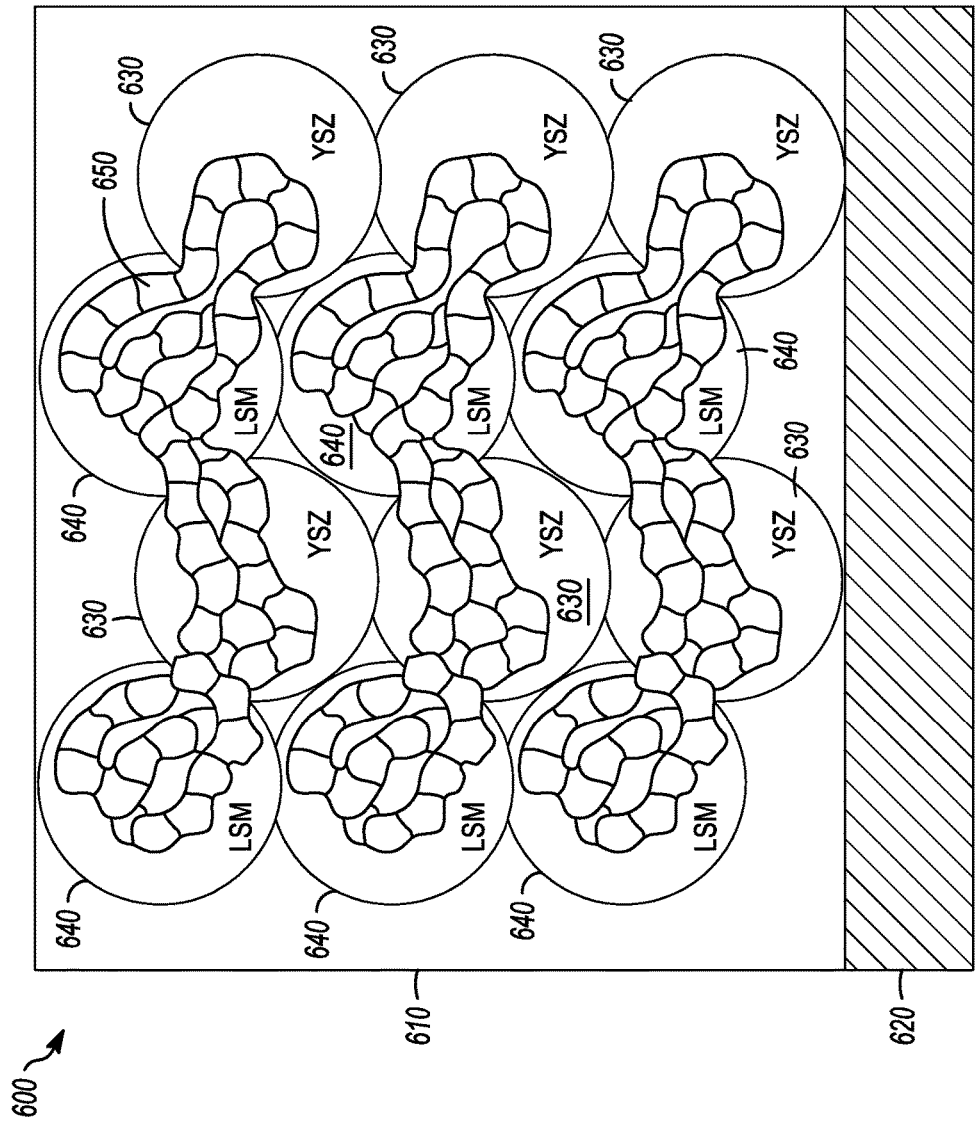
FIG. 6 is a diagram of an example cathode with a mesoporous network deposited on the YSZ/LSM.

FIG. 6 is a diagram of an example partial SOFC stack 600. As shown in FIG. 6, the partial SOFC stack 600 includes a cathode 610 and a solid oxide electrolyte 620. The cathode 610 includes YSZ structures 630 and LSM structures 640. The YSZ structures 630 are in contact with the solid oxide electrolyte 620 and extend to a current collector (not shown). As shown in FIG. 6, the LSM structures 640 are deposited on the YSZ structures 630.

A mesoporous network 650 is integrated with the YSZ structures 630 and the LSM structures 640. In this example, the mesoporous network 650 is embedded in the YSZ structures 630 and the LSM structures 640 such that it forms a continuous fibrous network through the YSZ structures 630 and the LSM structures 640. Alternatively, or in addition to, the mesoporous network 650 may be coated onto the YSZ structures 630 and the LSM structures 650 such that it forms a continuous fibrous network coating on the YSZ structures 630 and the LSM structures 640.

The mesoporous network 650 may be a mesoporous material that provides electron transport as shown in FIG. 2. The mesoporous material may include a nanoionic catalyst material, such as $ZrO_2$, and a base metal, such as Pt, and may form a fibrous network having a pore diameter from 2 nm to 50 nm. Alternatively, the nanoionic catalyst material may be a mixed oxide of $CeO_2$—$ZrO_2$. Alternative examples of the base metal may include Pd, Ag, Au (or their alloy combination), as well as PtCo, PtCoCu, PtPd, PtNi, PtCu, PtFe, PtPdNi, PtPdCu, PdCu, PdNi, or PdFe. The mesoporous network 650 may be implemented in any of the embodiments disclosed herein.

Figure 7:
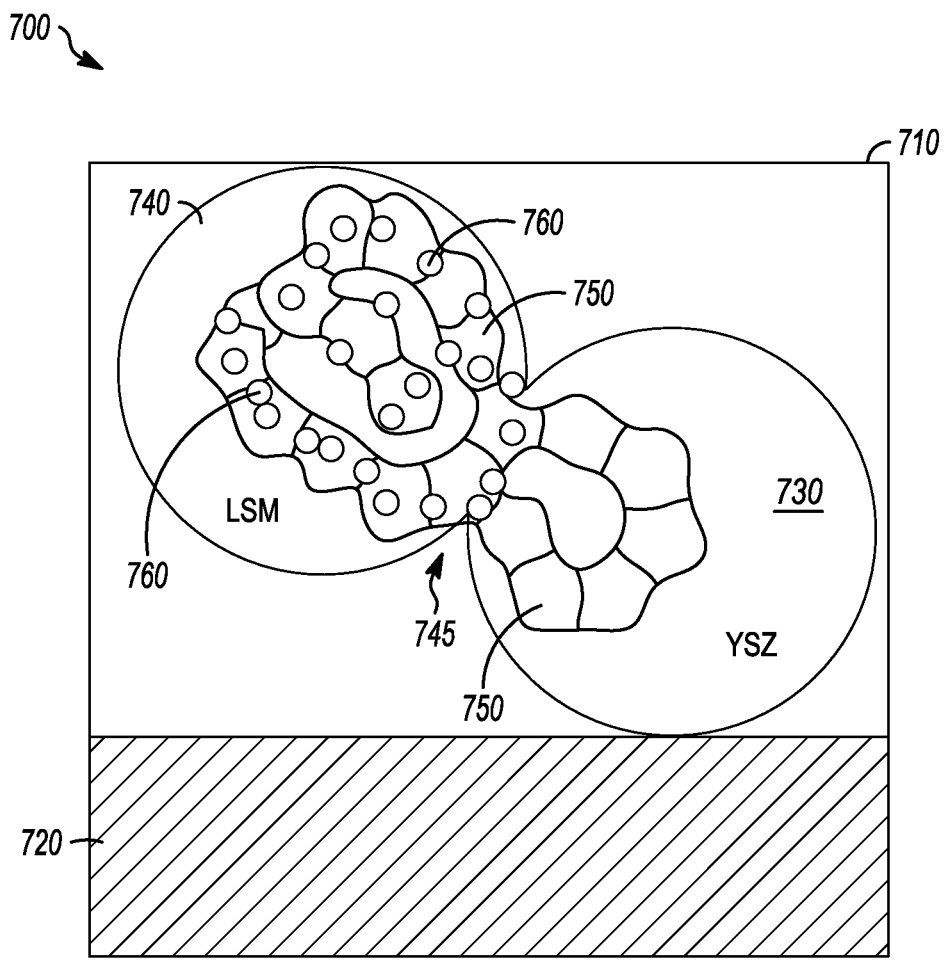
FIG. 7 is a diagram of an example cathode with a mesoporous network deposited on the YSZ/LSM and having a getter layer on the LSM.

FIG. 7 is a diagram of an example partial SOFC stack 700. As shown in FIG. 7, the partial SOFC stack 700 includes a cathode 710 and a solid oxide electrolyte 720. FIG. 7 shows that the cathode 710 includes a YSZ structure 730 and an LSM structure 740, although it is understood that the cathode 710 may include more than one YSZ structure 730 and more than one LSM structure 740. The YSZ structure 730 is in contact with the solid oxide electrolyte 720 and extends to a current collector (not shown). As shown in FIG. 7, the LSM structure 740 is deposited on the YSZ structure 730. The point at which the surface of the YSZ structure 730 and the LSM structure 740 are in contact is known as a TPB 745.

A mesoporous network 750 is integrated with the YSZ structure 730 and the LSM structure 740. In this example, the mesoporous network 750 is embedded in the YSZ structure 730 and the LSM structure 740 such that it forms a continuous fibrous network through the YSZ structure 730 and the LSM structure 740. Alternatively, or in addition to, the mesoporous network 750 may be coated onto the YSZ structure 730 and the LSM structure 750 such that it forms a continuous fibrous network coating on the YSZ structure 730 and the LSM structure 740.

In order to mitigate the effects of Cr-poisoning at the TPB 745, one or more getter layers may be added to the cathode 710. Referring to FIG. 7, the mesoporous network 750 is coated in a getter layer 760. The getter layer 760 may be a mesoporous structure of $SrO_2$, $SrNiO_3$, MnO, or $Mn_2O_3$ having a thickness from 1 nm to 1 micron and a pore diameter from 2 nm to 50 nm. In this example, the mesoporous network 750 of the LSM structure 740 is shown to be coated in the getter layer 760, however it is understood that the getter layer 760 may be coated on either the YSZ structure 730 or the LSM structure 740, or both. In some examples, the getter layer 760 may be located at or near the TPB 745. In some examples, a concentration of the getter layer 760 may be greater in the YSZ structure 730 than a concentration of the getter layer 760 in the LSM structure or vice versa.

The mesoporous network 750 may be a mesoporous material that provides electron transport as shown in FIG. 2. The mesoporous material may include a nanoionic catalyst material, such as $ZrO_2$, and a base metal, such as Pt, and may form a fibrous network having a pore diameter from 2 nm to 50 nm. Alternatively, the nanoionic catalyst material may be a mixed oxide of $CeO_2$—$ZrO_2$. Alternative examples of the base metal may include Pd, Ag, Au (or their alloy combination), as well as PtCo, PtCoCu, PtPd, PtNi, PtCu, PtFe, PtPdNi, PtPdCu, PdCu, PdNi, or PdFe. The mesoporous network 750 may be implemented in any of the embodiments disclosed herein.

Figure 8:
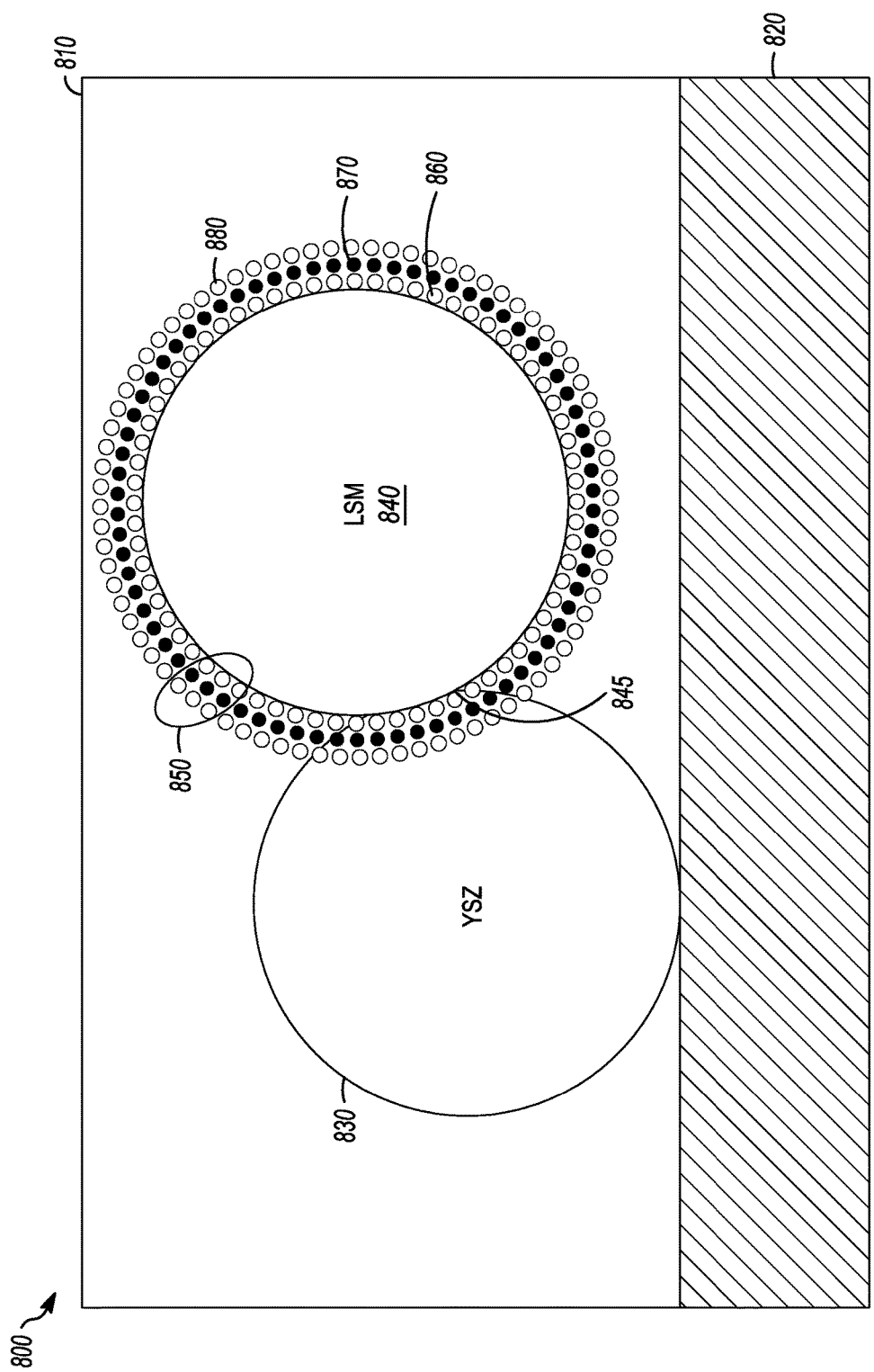
FIG. 8 is a diagram of an example cathode with the LSM wrapped in a first getter layer, a catalyst layer, and a second getter layer.

FIG. 8 is a diagram of an example cross-sectional side view of a partial SOFC stack 800. As shown in FIG. 8, the partial SOFC stack 800 includes a cathode 810 and a solid oxide electrolyte 820. FIG. 8 shows that the cathode 810 includes a YSZ structure 830 and an LSM structure 840, although it is understood that the cathode 810 may include more than one YSZ structure 830 and more than one LSM structure 840. The YSZ structure 830 is in contact with the solid oxide electrolyte 820 and extends to a current collector (not shown). As shown in FIG. 8, the LSM structure 840 is deposited on the YSZ structure 830. The point at which the surface of the YSZ structure 830 and the LSM structure 840 are in contact is known as a TPB 845.

A mesoporous network 850 is integrated with the YSZ structure 830 and the LSM structure 840. In this example, the mesoporous network 850 is coated onto the LSM structure 840 such that it forms a continuous fibrous network coating on the LSM structure 840. In some examples, the mesoporous network 850 may be coated onto either the YSZ structure 830 or the LSM structure 840, or both. Alternatively, or in addition to, the mesoporous network 850 may be embedded in either the YSZ structure 830 or the LSM structure 840, or both, such that it forms a continuous fibrous network through the YSZ structure 830 and the LSM structure 840.

In order to mitigate the effects of Cr-poisoning at the TPB 845, one or more getter layers may be added to the cathode 810. Referring to FIG. 8, the mesoporous network 850 includes a first getter layer 860, a catalyst layer structure 870, and a second getter layer 880. The first getter layer 860 and the second getter layer 880 may be mesoporous structures of $SrO_2$, $SrNiO_3$, MnO, or $Mn_2O_3$ having a thickness from 1 nm to 1 micron and a pore diameter from 2 nm to 50 nm. In some examples, the first getter layer 860 and the second getter layer 880 may be located at or near the TPB 845. In some examples, a concentration of the first getter layer 860 and the second getter layer 880 may be greater in the YSZ structure 830 than a concentration of the getter layer 860 in the LSM structure or vice versa.

The catalyst layer structure 870 may be a mesoporous material that provides electron transport as shown in FIG. 2. The catalyst material may include a nanoionic catalyst material, such as $ZrO_2$, and a base metal, such as Pt, and may form a fibrous network having a pore diameter from 2 nm to 50 nm. Alternatively, the nanoionic catalyst material may be a mixed oxide of $CeO_2$—$ZrO_2$. Alternative examples of the base metal may include Pd, Ag, Au (or their alloy combination), as well as PtCo, PtCoCu, PtPd, PtNi, PtCu, PtFe, PtPdNi, PtPdCu, PdCu, PdNi, or PdFe. The mesoporous network 850 may be implemented in any of the embodiments disclosed herein.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A solid oxide fuel cell, comprising:
a current collector;
a solid electrolyte layer; and
a cathode comprising:
yttria stabilized zirconia (YSZ) extending between the current collector and the solid electrolyte layer and in contact with the solid electrolyte layer;
lanthanum strontium manganite (LSM) deposited on the YSZ; and
a mesoporous nanoionic catalyst material embedded into the YSZ and LSM, wherein the mesoporous nanoionic catalyst material comprises an interconnected fibrous network.

2. The solid oxide fuel cell of claim 1, wherein the mesoporous nanoionic catalyst material is a base metal and ZrO2.

3. The solid oxide fuel cell of claim 2, wherein the base metal is Pt, PtPd, PtNi, PtCu, PtFe, PtPdNi, PtPdCu, PdCu, PdNi, or PdFe.

4. The solid oxide fuel cell of claim 1, wherein the mesoporous nanoionic catalyst material is a base metal and a mixed oxide of ZrO2-CeO2.

5. The solid oxide fuel cell of claim 4, wherein the base metal is Pt, PtPd, PtNi, PtCu, PtFe, PtPdNi, PtPdCu, PdCu, PdNi, or PdFe.

6. The solid oxide fuel cell of claim 1, wherein the mesoporous nanoionic catalyst material has a thickness of 0.25 nm to 200 nm.

7. The solid oxide fuel cell of claim 1, wherein the mesoporous nanoionic catalyst material has a pore diameter of 2 nm to 50 nm.

8. A solid oxide fuel cell, comprising:
a current collector;
a solid electrolyte layer; and
a cathode comprising:
yttria stabilized zirconia (YSZ) extending between the current collector and the solid electrolyte layer and in contact with the solid electrolyte layer;
lanthanum strontium manganite (LSM) deposited on the YSZ;
a mesoporous nanoionic catalyst material embedded into the YSZ and LSM, wherein the mesoporous nanoionic catalyst material comprises an interconnected fibrous network;
a first mesoporous getter layer deposited on the LSM to collect Cr vapor; and
a second mesoporous getter layer deposited on the mesoporous nanoionic catalyst material to collect Cr vapor.

9. The solid oxide fuel cell of claim 8, wherein the first mesoporous getter layer, the mesoporous nanoionic catalyst material, and the second mesoporous getter layer are combined to form a single mixed mesoporous getter layer.

10. The solid oxide fuel cell of claim 8, wherein the first mesoporous getter layer comprises SrO2, SrNiO3, or Mn2O3.

11. The solid oxide fuel cell of claim 8, wherein the second mesoporous getter layer comprises SrO2, SrNiO3, or Mn2O3.

12. The solid oxide fuel cell of claim 8, wherein the first mesoporous getter layer has a thickness of 1 nm to 1 micron.

13. The solid oxide fuel cell of claim 8, wherein the second mesoporous getter layer has a thickness of 1 nm to 1 micron.

14. The solid oxide fuel cell of claim 8, wherein the first mesoporous getter layer and the second mesoporous getter layer each have a pore diameter of 2 nm to 50 nm.

15. The solid oxide fuel cell of claim 8, wherein the mesoporous nanoionic catalyst material is a base metal and ZrO2.

16. The solid oxide fuel cell of claim 15, wherein the base metal is Pt, PtPd, PtNi, PtCu, PtFe, PtPdNi, PtPdCu, PdCu, PdNi, or PdFe.

17. The solid oxide fuel cell of claim 8, wherein the mesoporous nanoionic catalyst material is a base metal and a mixed oxide of ZrO2-CeO2.

18. The solid oxide fuel cell of claim 17, wherein the base metal is Pt, PtPd, PtNi, PtCu, PtFe, PtPdNi, PtPdCu, PdCu, PdNi, or PdFe.

19. The solid oxide fuel cell of claim 8, wherein the mesoporous nanoionic catalyst material has a thickness of 0.25 nm to 200 nm.

20. The solid oxide fuel cell of claim 8, wherein the mesoporous nanoionic catalyst material has a pore diameter of 2 nm to 50 nm.

* * * * *